(12) United States Patent
Hohteri et al.

(10) Patent No.: US 8,874,139 B2
(45) Date of Patent: Oct. 28, 2014

(54) POSITION LOCATION SYSTEM AND METHOD

(71) Applicant: Sstatzz Oy, Helsinki (FI)

(72) Inventors: Harri Hohteri, Helsinki (FI); Jirka Poropudas, Helsinki (FI)

(73) Assignee: Sstatzz Oy, Helsinki (FI)

( * ) Notice: Subject to any disclaimer, the term of this patent is extended or adjusted under 35 U.S.C. 154(b) by 49 days.

(21) Appl. No.: 13/852,489

(22) Filed: Mar. 28, 2013

(65) Prior Publication Data

US 2014/0295874 A1 Oct. 2, 2014

Related U.S. Application Data

(63) Continuation-in-part of application No. 13/660,385, filed on Oct. 25, 2012.

(51) Int. Cl.
*H04W 24/00* (2009.01)
*H04W 4/02* (2009.01)
*H04M 11/04* (2006.01)
*G08B 1/08* (2006.01)

(52) U.S. Cl.
CPC ..................................... *H04W 4/027* (2013.01)
USPC .................. 455/456.1; 455/404.2; 455/456.2; 455/456.3; 340/539.1; 340/539.11; 340/539.12; 340/539.13

(58) Field of Classification Search
USPC ........................................................ 455/456.1
See application file for complete search history.

(56) References Cited

U.S. PATENT DOCUMENTS

| | | | |
|---|---|---|---|
| 6,380,933 B1 | 4/2002 | Sharir | |
| 6,710,713 B1 | 3/2004 | Russo | |
| 6,950,123 B2 | 9/2005 | Martins | |
| 7,139,582 B2 * | 11/2006 | Couronne et al. | ......... 455/456.1 |
| 7,499,077 B2 | 3/2009 | Li | |
| 7,620,466 B2 | 11/2009 | Neale | |
| 8,279,051 B2 | 10/2012 | Khan | |
| 8,289,185 B2 | 10/2012 | Alonso | |
| 2007/0135243 A1 | 6/2007 | LaRue | |
| 2008/0089666 A1 | 4/2008 | Aman | |
| 2008/0129825 A1 | 6/2008 | DeAngelis | |
| 2008/0140233 A1 | 6/2008 | Seacat | |
| 2008/0192116 A1 | 8/2008 | Tamir | |
| 2009/0111582 A1 | 4/2009 | Schuler | |

(Continued)

FOREIGN PATENT DOCUMENTS

| | | |
|---|---|---|
| EP | 2150057 A2 | 2/2010 |
| EP | 2515548 A1 | 10/2012 |

*Primary Examiner* — Huy C Ho
(74) *Attorney, Agent, or Firm* — Ziegler IP Law Group, LLC

(57) ABSTRACT

A position location system for determining a position of a player within a playing area includes a wireless communication arrangement, a wireless-enabled projectile, a target region, and a computing arrangement. The projectile includes a wireless interface for communicating with the wireless terminal to exchange data, and a sensing arrangement for sensing a first distance travelled by the projectile relative to the playing area. The computing arrangement receives a wireless signal from the projectile, and processes the wireless signal to determine a second distance of the projectile from the wireless terminal. The computing arrangement receives data from the projectile indicative of a start and end time of a trajectory of the projectile, the first distance travelled by the projectile as sensed by the sensing arrangement and processes the data as a function of the start and end time to determine the position of the player within the playing area.

19 Claims, 7 Drawing Sheets

(56) References Cited

U.S. PATENT DOCUMENTS

| | | |
|---|---|---|
| 2009/0262137 A1 | 10/2009 | Walker |
| 2010/0134614 A1 | 6/2010 | Aman |
| 2011/0071792 A1 | 3/2011 | Miner |
| 2011/0194730 A1 | 8/2011 | Rhoads |
| 2012/0057852 A1 | 3/2012 | Devleeschouwer |
| 2012/0058845 A1 | 3/2012 | Crowley |
| 2012/0126973 A1* | 5/2012 | DeAngelis et al. ...... 340/539.13 |
| 2012/0271440 A1 | 10/2012 | Lunner |
| 2013/0162427 A1* | 6/2013 | Dibenedetto et al. .... 340/539.12 |

* cited by examiner

POSITION LOCATION SYSTEM AND METHOD

CROSS-REFERENCE TO RELATED APPLICATION(S)

This application is related to U.S. patent application Ser. No. 13/660,385 entitled "SPORTS APPARATUS AND METHOD" filed Oct. 25, 2012 and incorporated herein by reference in its entirety; and U.S. patent application Ser. No. 13/767,756 entitled "SPORTS TRAINING APPARATUS AND METHOD" filed Feb. 14, 2013 and incorporated herein by reference in its entirety.

FIELD

The aspects of the present disclosure generally relate to position location systems, and more specifically, to position location systems for determining a position of a player within a playing area. Further, the aspects of the present disclosure relate to methods of using the position location systems or determining the position of the player within the playing area. Furthermore, the aspects of the present disclosure also relates to software products recorded on machine-readable data storage media, wherein the software products are executable upon computing hardware to implement aforesaid methods.

BACKGROUND

Conventionally, various techniques, such as triangulation and trilateration, are used to determine a location of a player carrying a wireless-enabled object within a particular area. Such techniques involve using a set up of three of more base stations at suitable locations within that particular area. These base stations are operable to communicate with the wireless-enabled object using wireless signals, wherein Time-of-Flight (ToF) measurements and/or Received Signal Strength Indicator (RSSI) measurements of the wireless signals provide information about the relative distances between the wireless-enabled object and the base stations. Based on the knowledge of locations of the base stations and the relative distances of the base stations from the wireless-enabled object, the location of the player carrying the wireless-enabled object may be determined.

However, these conventional techniques suffer from a number of disadvantages. Firstly, the base stations need to be positioned at precise locations themselves to enable precise determination of the location of the wireless-enabled object. An error of a few meters, due to inappropriate positioning of the base stations, could render the whole technique useless. Secondly, a need to set up multiple base stations renders the conventional techniques expensive.

Various solutions have been proposed to eliminate the aforesaid problems faced by the conventional techniques. One such solution involves the use of a single base station that analyzes propagations and reflections of ultrasonic signals to determine the location of an object. However, the proposed solution also fails, as the results obtained from such an analysis are often inaccurate, due to possibility of reflections from unwanted objects and surfaces.

Therefore, there exists a need for a method and a system for determining a position of a player within a playing area, which uses fewer wireless terminals, and reduces the cost of setting up, as compared to the conventional techniques.

SUMMARY

The aspects of the disclosed embodiments seek to provide a position location system for determining a position of a player within a playing area.

The aspects of the disclosed embodiments also seek to provide a method of using the position location system for determining the position of the player within the playing area.

In one aspect, embodiments of the present disclosure provide a position location system for determining a position of a player within a playing area. The system includes a wireless communication arrangement, a wireless-enabled projectile, a target region and a computing arrangement. Beneficially, the wireless communication arrangement is implemented as a single wireless terminal. The wireless terminal may be positioned at substantially a single spatial location relative to the playing area.

Optionally, the wireless terminal may be implemented using a smart telephone that includes computing hardware which is operable to execute one or more software products recorded on machine-readable data storage media.

The wireless-enabled projectile includes a wireless interface for communicating with the wireless terminal to exchange data therewith. Beneficially, the wireless interface of the wireless-enabled projectile may be operable to emit wireless radiation in an omni-directional manner, namely substantially independently of an angle of orientation of the wireless-enabled projectile.

The wireless-enabled projectile also includes a sensing arrangement for sensing a first distance travelled by the wireless-enabled projectile relative to the playing area. Beneficially, the sensing arrangement may include a configuration of sensors, such as pressure sensors, accelerometers, gyroscopic sensors and/or timers, whose outputs are resolved and integrated for computing the first distance travelled by the wireless-enabled projectile.

In addition, the computing arrangement is operable to receive a wireless signal from the wireless-enabled projectile, and process the wireless signal to determine a second distance of the wireless-enabled projectile from the wireless terminal. The second distance may, for example, be determined by a received signal strength indicator (RSSI) measurement. Alternatively, the second distance may be determined by a received signal Time-of-Flight (ToF) measurement.

Further, the computing arrangement is operable to receive data from the wireless-enabled projectile that is indicative of a start time (t0) of a trajectory of the wireless-enabled projectile, an end time (t1) of the trajectory of the wireless-enabled projectile, and the first distance travelled by the wireless-enabled projectile as sensed by the sensing arrangement.

Furthermore, the computing arrangement is operable to process data indicative of the first and second distances as a function of the start time (t0) and the end time (t1), to determine therefrom the position of the player within the playing area. Beneficially, the computing arrangement may be operable to ignore computations of the position of the player which lies outside the playing area.

Optionally, the computing arrangement may be spatially implemented at the wireless terminal. Alternatively, the computing arrangement may be implemented at a remote server that may, for example, be operable to communicate with the wireless terminal.

The position location system may be suitably implemented for sports, such as basketball, handball, football, soccer, hockey, polo, and so on. Optionally, the system may be implemented for use in a basketball playing area, wherein the target region corresponds to a basketball net and the wireless-enabled projectile corresponds to a basketball.

In another aspect, embodiments of the present disclosure provide a method of using the position location system for determining the position of the player within the playing area.

In yet another aspect, embodiments of the present disclosure provide a software or computer program product recorded on machine-readable data storage media, wherein the software product is executable upon computing hardware for implementing the method of using the position location system.

Embodiments of the present disclosure substantially eliminate the aforementioned problems in the prior art, and enable users to know positions of various players within a playing area, without a need for setting up multiple wireless terminals, and thereby reduce cost of set up.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present invention, exemplary constructions of the disclosure are shown in the drawings. However, the present invention is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
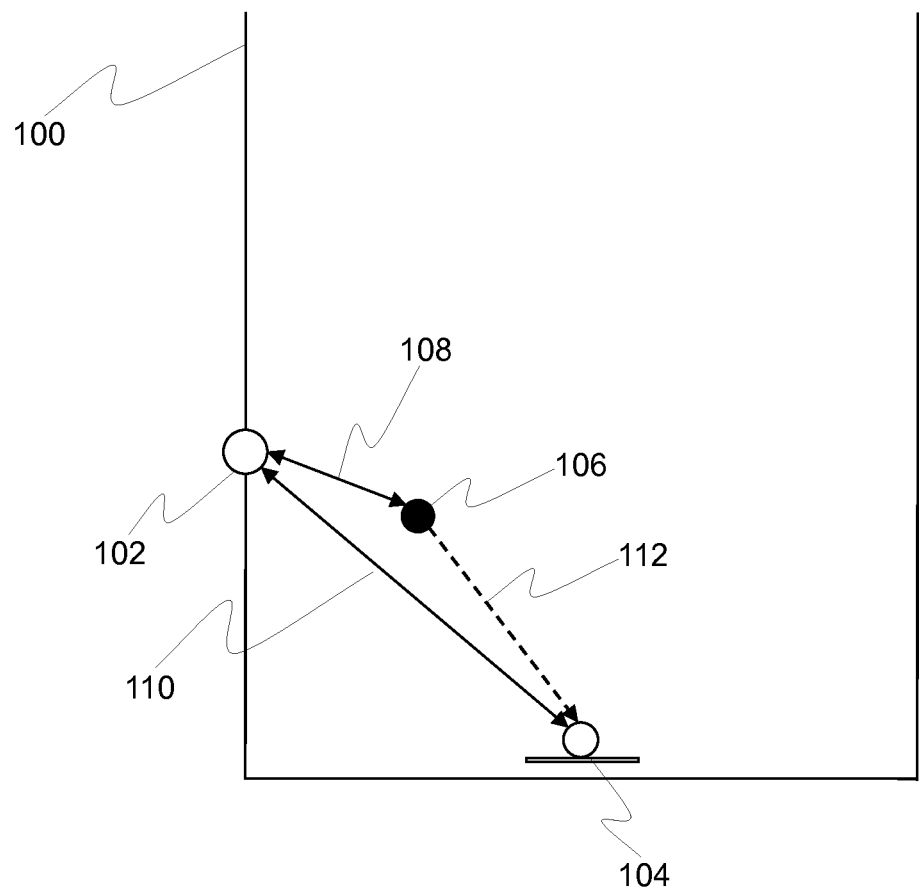
FIGS. 1A, 1B and 1C are schematic illustrations of an exemplary playing scenario in which a position location system is implemented for determining a position of a player within a playing area, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF THE DISCLOSURE

The following detailed description illustrates embodiments of the present disclosure and ways in which it can be implemented. Although the best mode of carrying out the present disclosure has been disclosed, those in the art would recognize that other embodiments for carrying out or practicing the aspects of the present disclosure are also possible.

Embodiments of the present disclosure provide a position location system for determining a position of a player within a playing area. The system includes a wireless communication arrangement, a wireless-enabled projectile and a target region. Beneficially, the wireless communication arrangement is implemented as a single wireless terminal. The wireless terminal may be positioned at substantially a single spatial location relative to the playing area.

Typical examples of the wireless terminal include, although are not limited to, mobile communication devices, a smart telephone, a Mobile Internet Device (MID), a tablet computer, an Ultra-Mobile Personal Computer (UMPC), a tablet, a Personal Digital Assistant (PDA), a web pad, a Personal Computer (PC), a Handheld PC, a laptop computer, and a cellular phone. The wireless terminal may, for example, be implemented using a smart telephone that includes computing hardware which is operable to execute one or more software or computer program products recorded on machine-readable data storage media. In one embodiment, the computer program product includes non-transitory computer readable code means, the computer readable code means, when executed by a processor, being configured to execute the methods and processes described herein.

The wireless-enabled projectile includes a wireless interface for communicating with the wireless terminal to exchange data therewith. Beneficially, the wireless interface of the wireless-enabled projectile may be operable to emit wireless radiation in an omni-directional manner, namely substantially independent of an angle of orientation of the wireless-enabled projectile.

The wireless-enabled projectile also includes a sensing arrangement for sensing a first distance travelled by the wireless-enabled projectile relative to the playing area. Beneficially, the sensing arrangement may include a configuration of sensors, such as pressure sensors, accelerometers, gyroscopic sensors and/or timers, whose outputs are resolved and integrated for computing the first distance travelled by the wireless-enabled projectile.

In addition, the system includes a computing arrangement, which is operable to receive a wireless signal from the wireless-enabled projectile, and process the wireless signal to determine a second distance of the wireless-enabled projectile from the wireless terminal. The second distance may, for example, be determined by a received signal strength indicator (RSSI) measurement. Alternatively, the second distance may be determined by a received signal Time-of-Flight (ToF) measurement.

Further, the computing arrangement is operable to receive data from the wireless-enabled projectile that is indicative of a start time (t0) of a trajectory of the wireless-enabled projectile, an end time (t1) of the trajectory of the wireless-enabled projectile, and the first distance travelled by the wireless-enabled projectile as sensed by the sensing arrangement.\

The computing arrangement is operable to process data indicative of the first and second distances as a function of the start time (t0) and the end time (t1), to determine therefrom the position of the player within the playing area. Beneficially, the computing arrangement may be operable to ignore computations of the position of the player which lies outside the playing area.

The computing arrangement may be spatially implemented at the wireless terminal. Alternatively, the computing arrangement may be implemented at a remote server that is operable to receive data indicative of the first distance from the wireless-enabled projectile and receive data indicative of the second distance from the wireless terminal.

Embodiments of the present disclosure are suitable for sports such as basketball, handball, football, soccer, hockey, and polo, but are not limited thereto. Beneficially, the system of the present disclosure may be implemented for use in a basketball playing area, wherein the target region corresponds to a basketball net and the wireless-enabled projectile corresponds to a basketball.

Figure 1B:
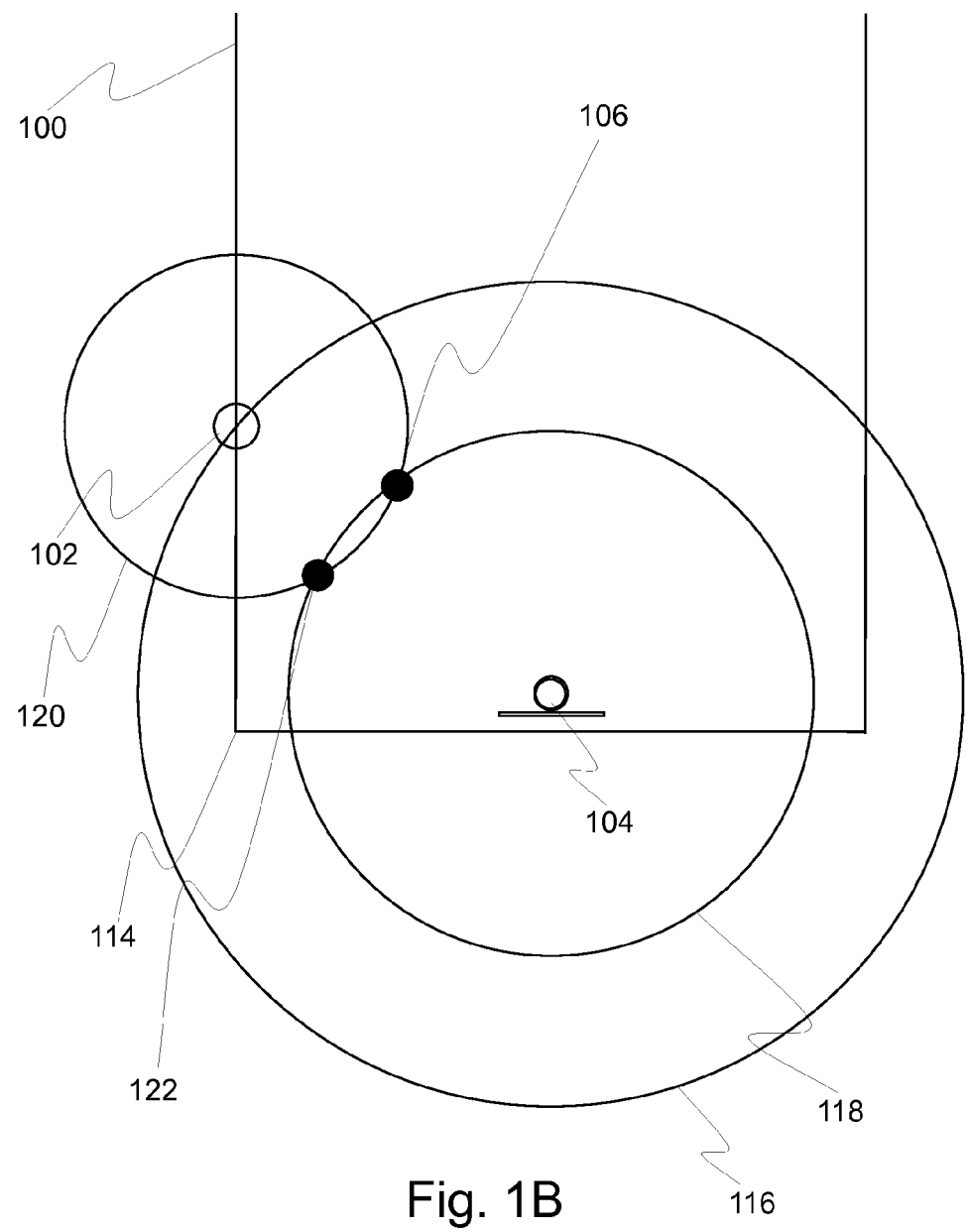
Figure 1C:
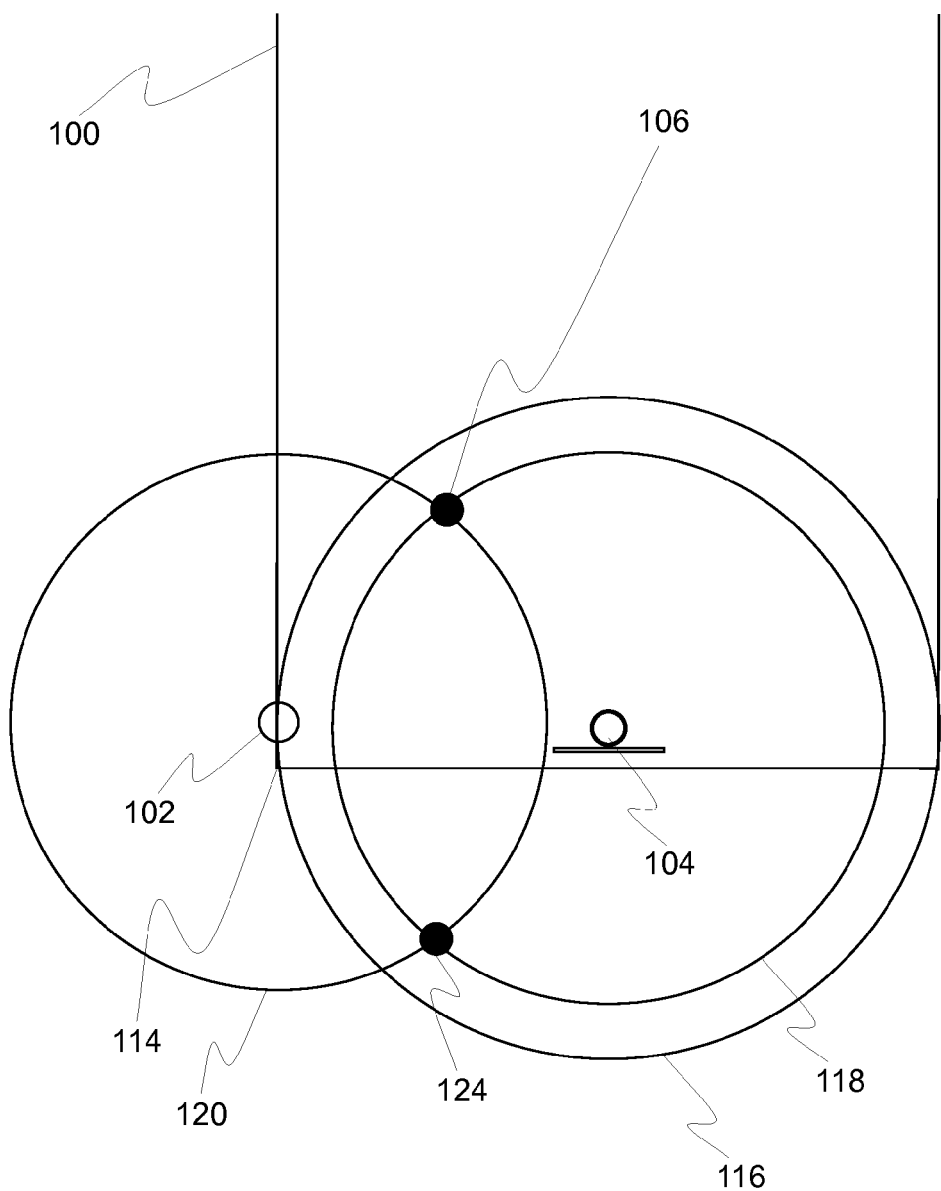

Referring now to the drawings, particularly by their reference numbers, FIGS. 1A, 1B and 1C are schematic illustrations of an example playing scenario in which a position location system is implemented for determining a position of a player within a playing area 100, in accordance with an embodiment of the present disclosure. The system includes a wireless communication arrangement implemented as a wireless terminal 102, a wireless-enabled projectile (not shown in the figure), a target region 104, and a computing arrangement (not shown in the figure).

The wireless communication arrangement may, for example, be employed via a Wireless Local Area Network (WLAN) or a Wireless Personal-Area Network (WPAN).

The wireless terminal 102 may, for example, be implemented using a smart telephone that includes computing hardware which is operable to execute one or more software and computer program products recorded on machine-readable data storage media. Typical examples of the wireless terminal 102 include, although are not limited to, a smart telephone, an MID, a tablet computer, a UMPC, a tablet, a PDA, a web pad, a PC, a Handheld PC, a laptop computer, and a cellular phone.

The wireless-enabled projectile includes a wireless interface (not shown in the figure) for communicating with the wireless terminal 102 to exchange data therewith. Beneficially, the wireless interface of the wireless-enabled projectile may be operable to emit wireless radiation in an omni-directional manner, namely substantially independent of an angle of orientation of the wireless-enabled projectile. Such an omni-directional manner of wireless radiation emission is achieved when a polar emission pattern of the wireless-enabled projectile is substantially devoid of angularly-dependent maxima.

The wireless-enabled projectile also includes a sensing arrangement (not shown in the figure) for sensing a first distance travelled by the wireless-enabled projectile relative to the playing area 100. Beneficially, the sensing arrangement may include a configuration of sensors, such as one or more pressure sensors, one or more accelerometers, one or more gyroscopic sensors and/or one or more timers. The sensing arrangement is operable to resolve and integrate outputs generated by the configuration of sensors. The outputs may, for example, be indicative of acceleration and/or rotation and/or orientation of the wireless-enabled projectile as a function of time.

With reference to FIG. 1A, the player is located at a position 106 within the playing area 100. The player throws the wireless-enabled projectile towards the target region 104, whereby the wireless-enabled projectile follows a trajectory in flight. A start time (t0) of the trajectory of the wireless-enabled projectile corresponds to the time at which the player throws the wireless-enabled projectile, while an end time (t1) of the trajectory of the wireless-enabled projectile corresponds to the time at which the wireless-enabled projectile reaches the target region 104. The start time (t0) and the end time (t1) may be sensed by the sensing arrangement within the wireless-enabled projectile, using the configuration of sensors therein.

The wireless interface of the wireless-enabled projectile is operable to transmit a wireless signal to the wireless terminal 102 at the start time (t0), wherefrom the computing arrangement is operable to receive the wireless signal, and process the wireless signal to determine a second distance of the wireless-enabled projectile from the wireless terminal 102. The second distance of the wireless-enabled projectile from the wireless terminal 102 corresponds to the distance between the player and the wireless terminal 102. The second distance of the wireless-enabled projectile from the wireless terminal 102 has been depicted by a line 108, in FIG. 1A.

In accordance with an embodiment of the present disclosure, the wireless terminal 102 may be positioned at substantially a single spatial location relative to the playing area 100. In such a case, the distance between the target region 104 and the wireless terminal 102 may be determined using the position coordinates of the single spatial location of the wireless terminal 102 relative to the playing area 100.

In accordance with an alternative embodiment of the present disclosure, the wireless terminal 102 may be alterably positioned at various spatial locations relative to the playing area 100. In such a case, the wireless interface of the wireless-enabled projectile may be operable to transmit another wireless signal to the wireless terminal 102 at the end time (t1), wherefrom the computing arrangement may be operable to receive and process the wireless signal to determine a third distance of the wireless-enabled projectile from the wireless terminal 102. The third distance of the wireless-enabled projectile from the wireless terminal 102 corresponds to the distance between the target region 104 and the wireless terminal 102. The third distance of the wireless-enabled projectile from the wireless terminal 102 has been depicted by a line 110, in FIG. 1A.

Optionally, the wireless terminal 102 includes a Global Positioning System (GPS) receiver for determining an absolute position of the wireless terminal 102 upon a surface of the Earth. Optionally, a user of the wireless terminal 102 can calibrate corners of the playing area 100 and the target region 104, thereby simplifying computations required to be performed when data is received from the wireless-enabled projectile for determining a trajectory of the wireless-enabled projectile when in flight towards the target region 104.

The second distance and/or the third distance may, for example, be determined by RSSI measurements. Alternatively, the second distance and/or the third distance may be determined by ToF measurements of the received wireless signals.

Meanwhile, the sensing arrangement within the wireless-enabled projectile is operable to sense data indicative of acceleration and/or rotation and/or orientation of the wireless-enabled projectile as a function of time. Subsequently, the computing arrangement is operable to receive data from the wireless-enabled projectile that is indicative of the start time (t0), the end time (t1), and the first distance travelled by the wireless-enabled projectile as sensed by the sensing arrangement. The computing arrangement is then operable to compute the first distance travelled by the wireless-enabled projectile using the received data. The first distance may, for example, be computed using Newtonian equations of motion. In FIG. 1A, the first distance travelled by the wireless-enabled projectile has been depicted by a dashed line 112.

Further, the computing arrangement is operable to process data indicative of at least one of: the first distance, the second distance, the third distance, the spatial location of the target region 104, and the geometry of the playing area 100, to determine therefrom the position 106 of the player within the playing area 100. Details of the processing executed by the computing arrangement have been provided in conjunction with FIGS. 1B and 1C.

The computing arrangement may be spatially implemented at the wireless terminal 102. Alternatively, the computing arrangement may be implemented at a remote server that is operable to receive data indicative of the first distance from the wireless-enabled projectile and receive data indicative of the second distance and/or the third distance from the wireless terminal 102.

Embodiments of the present disclosure are suitable for sports such as basketball, handball, football, soccer, hockey, and polo, but are not limited thereto.

In the example playing scenario depicted in FIGS. 1A, 1B and 1C, let us consider that the playing area 100 is a basketball playing area, wherein the wireless-enabled projectile corresponds to a basketball, and the target region 104 corresponds to a basketball net. The target region 104 is preferably positioned at a fixed spatial location relative to the playing area 100. The spatial location of the target region 104 may, for example, be known from the geometry of the playing area 100. With reference to FIG. 1B, the playing area 100 includes a corner 114, which may be considered as the origin of the coordinate system for use in analysis of the geometry of the playing area 100.

For the sake of simplicity, it is assumed that:

$d_{projectile}$ is the first distance travelled by the wireless-enabled projectile, $d_{player}$ is the second distance between the player and the wireless terminal 102, $d_{target}$ is the third distance between the target region 104 and the wireless terminal 102, (0, 0) are the position coordinates of the corner 114 of the playing area 100, $(x_{player}, y_{player})$ are the position coordinates of the player relative to the playing area 100 at the start time (t0), $(x_{terminal}, y_{terminal})$ are the position coordinates of the spatial location of the wireless terminal 102 relative to the playing area 100, and $(x_{target}, y_{target})$ are the position coordinates of the spatial location of the target region 104 relative to the playing area 100.

As mentioned earlier, $(x_{target}, y_{target})$ are known from the geometry of the playing area 100, while $d_{projectile}$, $d_{player}$ and $d_{target}$ are determined by the computing arrangement as described earlier.

With reference to FIG. 1B, it is evident that the spatial location of the wireless terminal 102 relative to the playing area 100 lies on a circle 116, which has a centre at $(x_{target}, y_{target})$ and a radius of $d_{target}$. Beneficially, the wireless terminal 102 may be positioned at the boundary of the playing area 100, such that $x_{terminal}$ is zero and $y_{terminal}$ has a positive value.

The variable, $y_{terminal}$, may be determined by using the equation of the circle 116 as shown below:

$$(x_{target}-x_{terminal})^2+(y_{target}-y_{terminal})^2=d_{target}^2$$

Putting $x_{terminal}=0$ in the equation of circle 116, $y_{terminal}$ may be obtained as:

$$y_{terminal}=y_{target}\pm\sqrt{(d_{target}^2-x_{target}^2)}$$

Further, it is evident that the position of the player lies on a circle 118 and a circle 120. The circle 118 has a centre at $(x_{target}, y_{target})$ and a radius of $d_{projectile}$, while the circle 120 has a centre at $(x_{terminal}, y_{terminal})$ and a radius of $d_{player}$. The variables, $x_{player}$ and $y_{player}$, may be determined by using the equations of the circle 118 and the circle 120 shown below:

$$(x_{target}-x_{player})^2+(y_{target}-y_{player})^2=d_{projectile}^2$$

$$(x_{terminal}-x_{player})^2+(y_{terminal}-y_{player})^2=d_{player}^2$$

As these equations are quadratic, two possible positions of the player are obtained. In FIG. 1B, the two possible positions of the player have been depicted as the position 106 (i.e., the actual position of the player) and a possible position 122. In order to determine the actual position of the player relative to the playing area 100, it is required that the possible position 122 of the player is eliminated.

With reference to FIG. 1C, the wireless terminal 102 is beneficially located in a proximity of the corner 114 of the playing area 100, in accordance with an embodiment of the present invention. The circle 116 and the circle 120 vary with the spatial location of the wireless terminal 102, as shown in FIG. 1C. Now, the two possible positions of the player are depicted as the position 106 and a possible position 124. It is evident that the possible position 124 of the player lies outside the playing area 100. Beneficially, the computing arrangement is operable to ignore computations of the possible position 124 of the player which lies outside the playing area 100.

Optionally, the computing arrangement may be operable to provide instructions to the user of the wireless terminal 102 to position the wireless terminal 102 in a proximity of the corner 114, whenever the computing arrangement identifies two possible positions of the player that lie within the playing area 100.

It should be noted here that the playing area 100 is not limited to a specific number of players and target regions. FIGS. 1A, 1B and 1C are merely examples, which should not unduly limit the scope of the claims herein. One of ordinary skill in the art would recognize many variations, alternatives, and modifications of embodiments herein.

Figure 2:
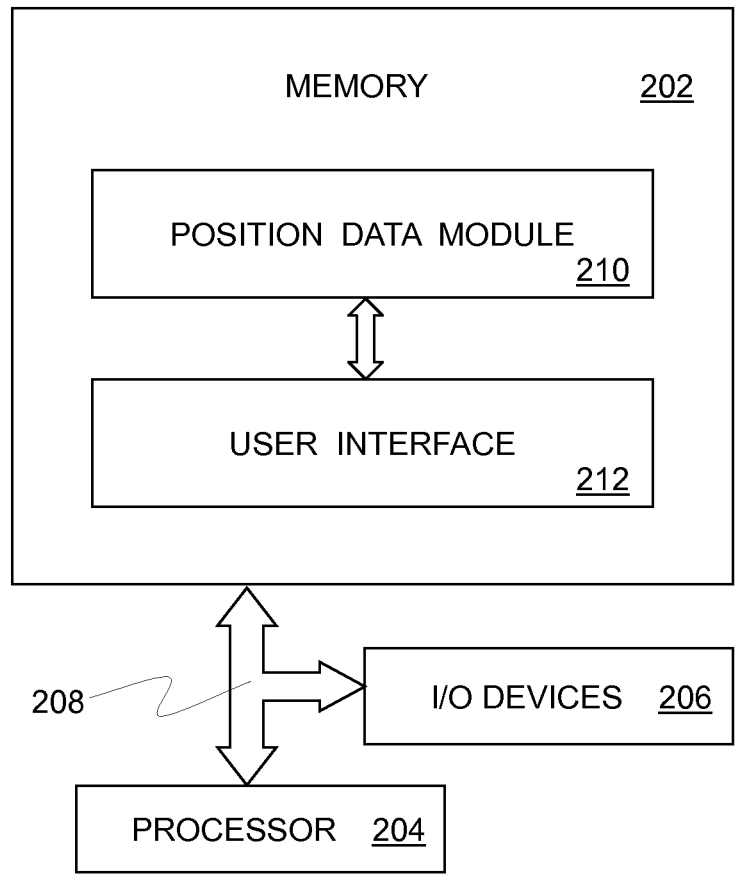
FIG. 2 is a schematic illustration of various components in one exemplary implementation of a computing arrangement, in accordance with an embodiment of the present disclosure.

FIG. 2 is a schematic illustration of various components in one exemplary implementation of the computing arrangement, in accordance with an embodiment of the present invention. The computing arrangement may, for example, be spatially implemented at the wireless terminal 102. The computing arrangement includes, but is not limited to, a memory 202, a processor 204, Input/Output (I/O) devices 206, and a system bus 208 that operatively couples various components including memory 202 and processor 204. Memory 202 stores a position data module 210. Optionally, memory 202 stores a user interface 212.

When executed on processor 204, the position data module 210 within the computing arrangement is operable to communicate with the wireless-enabled projectile. As described earlier, the position data module 210 may be operable to receive one or more wireless signals from the wireless-enabled projectile at the start time (t0) and/or the end time (t1) to determine the second distance and/or the third distance, respectively. The second distance and/or the third distance may, for example, be determined by either RSSI or ToF measurements of the wireless signals.

In addition, the position data module 210 is operable to receive data from the wireless-enabled projectile that is indicative of the start time (t0), the end time (t1), and the first distance travelled by the wireless-enabled projectile as sensed by the sensing arrangement within the wireless-enabled projectile. The position data module 210 is then operable to compute the first distance travelled by the wireless-enabled projectile using the received data.

Further, the position data module 210 is also operable to process data indicative of at least one of: the first distance, the second distance, the third distance, the spatial location of the target region 104, and the geometry of the playing area 100, to determine therefrom the actual position of the player within the playing area 100. In the example playing scenario illustrated with reference to FIGS. 1A, 1B and 1C, the actual position of the player corresponds to the position 106 of the player within the playing area 100.

Beneficially, the position data module 210 is operable to ignore computations of the position of the player which lies outside the playing area 100. In the example playing scenario illustrated with reference to FIG. 1C, the possible position 124 lies outside the playing area 100, and therefore, is ignored.

When executed on processor 204, the user interface 212 is operable to display the actual position of the player within the playing area 100.

Optionally, the user interface 212 may be operable to provide instructions to the user of the wireless terminal 102 to position the wireless terminal 102 in a proximity of the corner 114 of the playing area 100, whenever the position data module 210 identifies two possible positions of the player that lie within the playing area 100.

Optionally, the computing arrangement may be coupled in communication with a remote server (not shown in the figure) that is operable to collect data indicative of positions of various players as a function of time. The remote server may, for example, be operable to analyze the positions of the various players to provide feedback on the performance of the various players.

Alternatively, the computing arrangement may be coupled in communication with one or more databases (not shown in the figure), for example, whereat the positions of the various players are recorded as a function of time.

FIG. 2 is merely an example, which should not unduly limit the scope of the claims herein. It is to be understood that the specific designation for the computing arrangement is for the convenience of reader and is not to be construed as limiting the computing arrangement to specific numbers, types, or arrangements of modules and/or components of the computing arrangement. One of ordinary skill in the art would recognize many variations, alternatives, and modifications of embodiments of the present disclosure. For example, the position data module 210 may also be operable to iteratively perform the analysis to determine the position of another player who passed the wireless-enabled projectile to the player positioned at the position 106 before the start time (t0).

Figure 3:
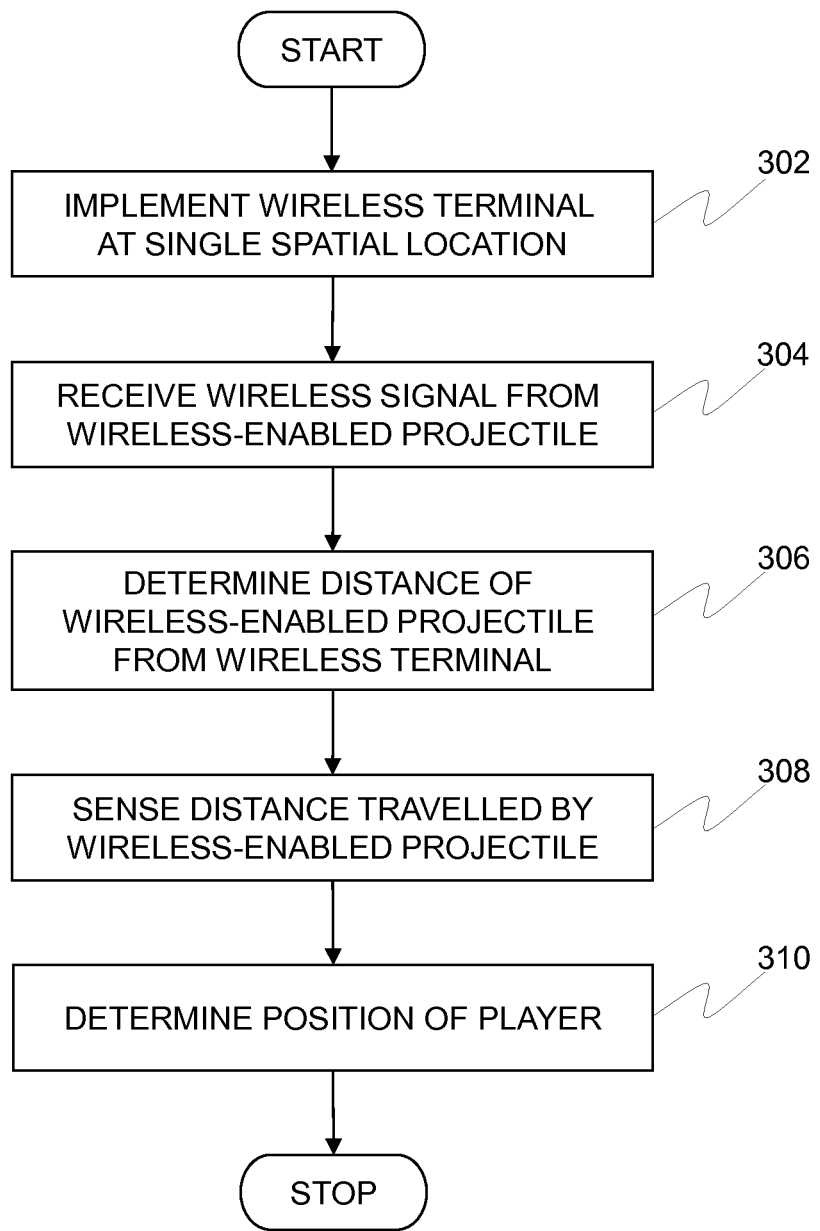
FIG. 3 is an illustration of steps of a method of using the position location system for determining the position of the player within the playing area, in accordance with an embodiment of the present disclosure.

FIG. 3 is an illustration of steps of a method of using the position location system for determining the position of the player within the playing area 100, in accordance with an embodiment of the present disclosure. The method is depicted as a collection of steps in a logical flow diagram, which represents a sequence of steps that can be implemented in hardware, software, or a combination thereof.

At a step 302, the wireless communication arrangement is implemented as a single wireless terminal, depicted as the wireless terminal 102 in FIGS. 1A, 1B and 1C. In accordance with the step 302, the wireless terminal 102 may be positioned at substantially a single spatial location relative to the playing area 100. Alternatively, the wireless terminal 102 may be alterably positioned at various spatial locations relative to the playing area 100.

At a step 304, the wireless terminal 102 receives a wireless signal from the wireless-enabled projectile, wherefrom, at a step 306, the computing arrangement processes the wireless signal to determine the second distance of the wireless-enabled projectile from the wireless terminal 102. For example, the step 304 may be performed at the start time (t0), to determine the distance between the player and the wireless terminal 102 at the step 306. The step 306 may be performed using either RSSI or ToF measurements of the wireless signal received at the step 304.

Meanwhile, at a step 308, the sensing arrangement within the wireless-enabled projectile senses data indicative of the start time (t0), the end time (t1), and the first distance travelled by the wireless-enabled projectile, and transmits the sensed data to the computing arrangement.

Thereafter, at a step 310, the computing arrangement processes data indicative of the first and second distances as a function of the start time (t0) and the end time (t1), to determine therefrom the position of the player within the playing area 100.

It should be noted here that the steps 302 to 310 are only illustrative and other alternatives can also be provided where one or more steps are added, one or more steps are removed, or one or more steps are provided in a different sequence without departing from the scope of the claims herein. For example, the computing arrangement may perform an additional step of ignoring computations of the position of the player which lies outside the playing area 100.

Figure 4A:
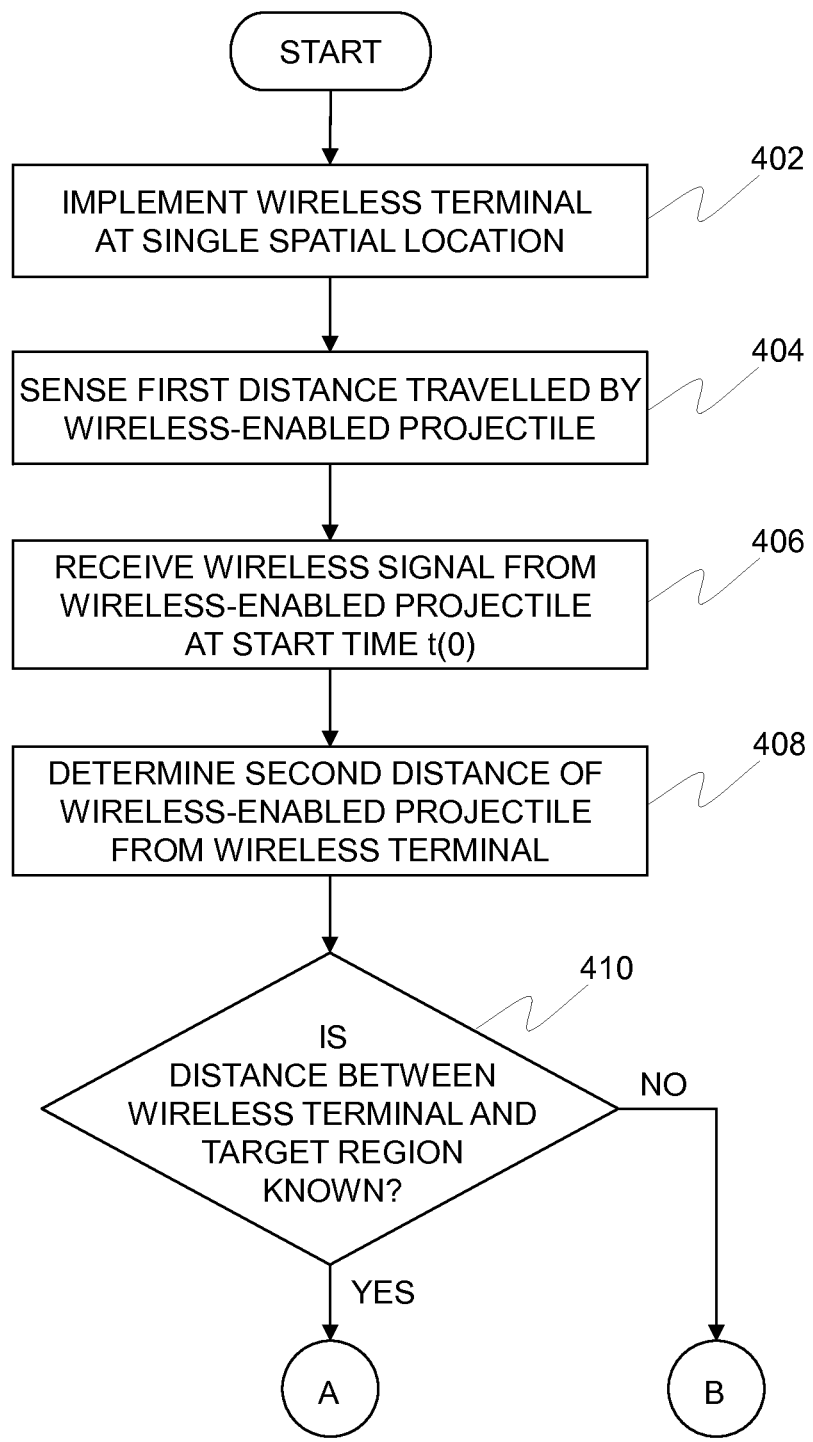
FIGS. 4A and 4B are an illustration of steps of a detailed method of using the position location system for determining the position of the player within the playing area, in accordance with an embodiment of the present disclosure.
Figure 4B:
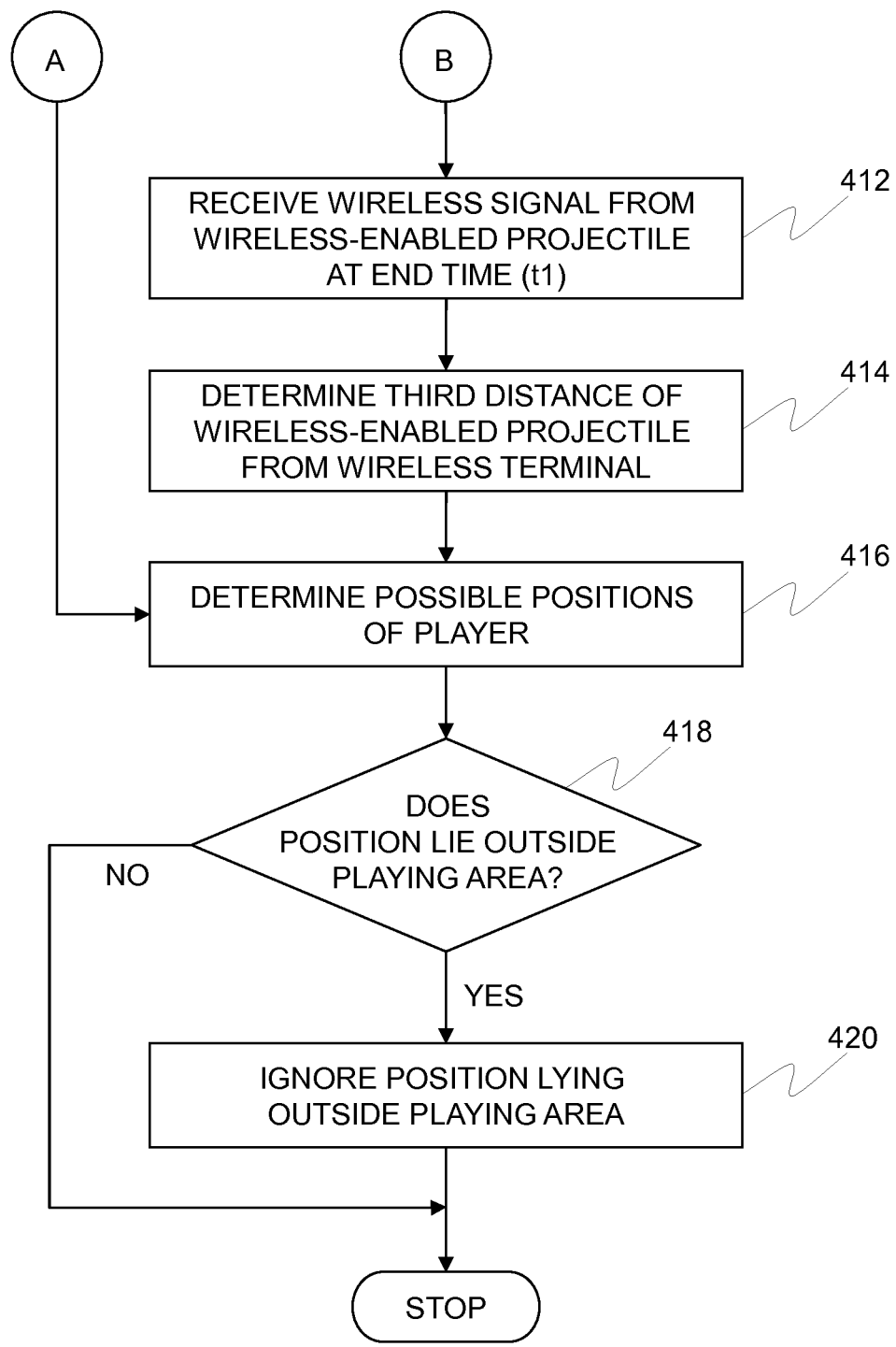

FIGS. 4A and 4B are an illustration of steps of a detailed method of using the position location system for determining the position of the player within the playing area 100, in accordance with an embodiment of the present disclosure. The method is depicted as a collection of steps in a logical flow diagram, which represents a sequence of steps that can be implemented in hardware, software, or a combination thereof.

At a step 402, the wireless communication arrangement is implemented as a single wireless terminal, depicted as the wireless terminal 102 in FIGS. 1A, 1B and 1C. In accordance with the step 402, the wireless terminal 102 may be positioned at substantially a single spatial location relative to the playing area 100. Alternatively, the wireless terminal 102 may be alterably positioned at various spatial locations relative to the playing area 100.

At a step 404, the sensing arrangement within the wireless-enabled projectile senses the first distance travelled by the wireless-enabled projectile relative to the playing area 100. As described earlier, the first distance travelled by the wireless-enabled projectile corresponds to the distance between the player and the target region 104.

In accordance with the step 404, the sensing arrangement senses the start time (t0) of the trajectory of the wireless-enabled projectile, when the player throws the wireless-enabled projectile. In addition, the sensing arrangement senses the end time (t1) of the trajectory of the wireless-enabled projectile, when the wireless-enabled projectile reaches the target region 104. Accordingly, the step 404 may include a sub-step in which the sensing arrangement resolves and integrates outputs generated by the configuration of sensors, which may, for example, be indicative of acceleration and/or rotation and/or orientation of the wireless-enabled projectile as a function of time.

At a step 406, the wireless interface of the wireless-enabled projectile transmits a wireless signal to the wireless terminal 102 at the start time (t0), wherefrom the computing arrangement is operable to receive the wireless signal.

Subsequently, at a step 408, the computing arrangement processes the wireless signal received at the step 406 to determine the second distance of the wireless-enabled projectile from the wireless terminal 102. As described earlier, the second distance of the wireless-enabled projectile from the wireless terminal 102 corresponds to the distance between the player and the wireless terminal 102. The step 408 may, for example, be performed using either RSSI or ToF measurements of the wireless signal received at the step 406.

Next, at a step 410, the computing arrangement checks whether or not the distance between the wireless terminal 102 and the target region 104 is known; for example, the wireless terminal 102 optionally includes a GPS receiver which enables an absolute position of the wireless terminal to be determined, and optionally, the user of the wireless terminal 102 determines a position of the target region 104 by moving the wireless terminal 102 to the target region 104 for calibrating an absolute position of the target region 104, for example prior to a playing event being implemented in the playing area 100. The step 410 may, for example, be performed in accordance with an embodiment of the present invention, wherein the wireless terminal 102 is alterably positioned at the various spatial locations relative to the playing area 100.

If, at the step 410, it is found that the distance between the wireless terminal 102 and the target region 104 is known, a step 416 is performed. If, at the step 410, it is found that the distance between the wireless terminal 102 and the target region 104 is not known, a step 412 is performed.

Accordingly, at the step 412, the wireless interface of the wireless-enabled projectile transmits another wireless signal to the wireless terminal 102 at the end time (t1), wherefrom the computing arrangement receives the wireless signal.

Subsequently, at a step 414, the computing arrangement processes the wireless signal received at the step 412 to determine the third distance of the wireless-enabled projectile from the wireless terminal 102. The third distance of the wireless-enabled projectile from the wireless terminal 102 corresponds to the distance between the wireless terminal 102 and the target region 104. The step 414 may, for example, be performed using either RSSI or ToF measurements of the wireless signal received at the step 412.

Meanwhile, the sensing arrangement performs the step 404, wherefrom the computing arrangement computes the first distance travelled by the wireless-enabled projectile.

Further, at the step 416, the computing arrangement processes data indicative of at least one of: the first distance, the second distance, the third distance, the spatial location of the target region 104, and the geometry of the playing area 100, to determine therefrom one or more possible positions of the player within the playing area 100.

Thereafter, at a step 418, the computing arrangement checks whether or not a possible position of the player lies outside the playing area 100. If, at the step 418, it is found that a possible position of the player lies outside the playing area 100, a step 420 is performed.

In accordance with the step 420, the computing arrangement ignores computations of the possible position of the player which lies outside the playing area 100.

If, at the step 418, it is found that none of the possible positions of the player lies outside the playing area 100, the computing arrangement may perform an optional step of providing instructions to the user of the wireless terminal 102 to position the wireless terminal 102 in a proximity of the corner 114 of the playing area 100.

It should be noted here that the steps 402 to 420 are only illustrative and other alternatives can also be provided where one or more steps are added, one or more steps are removed, or one or more steps are provided in a different sequence without departing from the scope of the claims herein. For example, the step 404 may be performed simultaneously with the steps 406 to 414.

Embodiments of the present disclosure can be used for various purposes, including, though not limited to, enabling users to know positions of various players within a playing area, without a need for setting up multiple wireless terminals, thereby reducing cost of set up, and enabling further analysis of the positions of the various players to provide feedback on the performance of the various players.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types.

Modifications to embodiments of the present disclosure described in the foregoing are possible without departing from the scope of the present invention as defined by the accompanying claims. Expressions such as "including", "comprising", "incorporating", "consisting of", "have", "is" used to describe and claim the aspects of the present disclosure are intended to be construed in a non-exclusive manner, namely allowing for items, components or elements not explicitly described also to be present. Reference to the singular is also to be construed to relate to the plural.

What is claimed is:

1. A position location system for determining a position of a player within a playing area, wherein the system includes a wireless communication arrangement, a wireless-enabled projectile and a target region, wherein:
   the wireless communication arrangement is implemented as a wireless terminal at substantially a single spatial location relative to the playing area;
   the wireless-enabled projectile includes a wireless interface for communicating with the wireless terminal to exchange data therewith, and a sensing arrangement for sensing a first distance travelled by the wireless-enabled projectile relative to the playing area;
   the system includes a computing arrangement for receiving a wireless signal from the wireless-enabled projectile, wherein the computing arrangement is operable to process the wireless signal to determine a second distance of the wireless-enabled projectile from the wireless terminal, and wherein the computing arrangement is operable to receive data from the wireless-enabled projectile indicative of a start time (t0) of a trajectory of the wireless-enabled projectile, an end time (t1) of the trajectory of the wireless-enabled projectile, and the first distance travelled by the wireless-enabled projectile as sensed by the sensing arrangement; and
   the computing arrangement is operable to process data indicative of the first and second distances as a function of the start time (t0) and the end time (t1) to determine therefrom the position of the player within the playing area.

2. The position location system as claimed in claim 1, wherein the computing arrangement is operable to ignore computations of the position of the player which lies outside the playing area.

3. The position location system as claimed in claim 1, wherein the second distance is determined by a received signal strength indicator (RSSI) measurement.

4. The position location system as claimed in claim 1, wherein the second distance is determined by a received signal time-of-flight (ToF) measurement.

5. The position location system as claimed in claim 1, wherein the sensing arrangement of the wireless-enabled projectile includes a configuration of accelerometers whose outputs are resolved and integrated for computing the first distance.

6. The position location system as claimed in claim 1, wherein the computing arrangement is spatially implemented at the wireless terminal.

7. The position location system as claimed in claim 1, wherein the wireless terminal is implemented using a smart telephone including computing hardware which is operable to execute one or more software products recorded on machine-readable data storage media.

8. The position location system as claimed in claim 1, wherein the system is implemented for use in a basketball playing area, wherein the target region corresponds to a basketball net and the wireless-enabled projectile corresponds to a basketball.

9. The position location systems as claimed in claim 1, wherein the wireless interface of the wireless-enabled projectile is operable to emit wireless radiation in an omni-directional manner, namely substantially independent of an angle of orientation of the wireless-enabled projectile.

10. A method of using a position location system for determining a position of a player within a playing area, wherein the system includes a wireless communication arrangement, a wireless-enabled projectile and a target region, wherein the method includes:
 implementing the wireless communication arrangement as a wireless terminal at substantially a single spatial location relative to the playing area;
 including in the wireless-enabled projectile a wireless interface for communicating with the wireless terminal to exchange data therewith, and a sensing arrangement for sensing a first distance travelled by the wireless-enabled projectile relative to the playing area;
 including in the system a computing arrangement for receiving a wireless signal from the wireless-enabled projectile, wherein the computing arrangement is operable to process the wireless signal to determine a second distance of the wireless-enabled projectile from the wireless terminal, and wherein the computing arrangement is operable to receive data from the wireless-enabled projectile indicative of a start time (t0) of a trajectory of the wireless-enabled projectile, an end time (t1) of the trajectory of the wireless-enabled projectile, and the first distance travelled by the wireless-enabled projectile as sensed by the sensing arrangement; and
 using the computing arrangement to process data indicative of the first and second distances as a function of the start time (t0) and the end time (t1) to determine therefrom the position of the player within the playing area.

11. The method as claimed in claim 10, wherein the method includes using the computing arrangement to ignore computations of the position of the player which lies outside the playing area.

12. The method as claimed in claim 10, wherein the second distance is determined by a received signal strength indicator (RSSI) measurement.

13. The method as claimed in claim 10, wherein the second distance is determined by a received signal time-of-flight (ToF) measurement.

14. The method as claimed in claim 10, wherein the sensing arrangement of the wireless-enabled projectile includes a configuration of accelerometers whose outputs are resolved and integrated for computing the first distance.

15. The method as claimed in claim 10, wherein the computing arrangement is spatially implemented at the wireless terminal.

16. The method as claimed in claim 10, wherein the wireless terminal is implemented using a smart telephone including computing hardware which is operable to execute one or more software products recorded on machine-readable data storage media.

17. The method as claimed in claim 10, wherein the method is implemented for use in a basketball playing area, wherein the target region corresponds to a basketball net and the wireless-enabled projectile corresponds to a basketball.

18. The method as claimed in claim 10, wherein the wireless interface of the wireless-enabled projectile is operable to emit wireless radiation in an omni-directional manner, namely substantially independent of an angle of orientation of the wireless-enabled projectile.

19. A software product recorded on machine-readable data storage media, wherein the software product is executable upon computing hardware for implementing the method as claimed in claim 10.

\* \* \* \* \*